United States Patent [19]
Nakanishi et al.

[11] 4,158,834
[45] Jun. 19, 1979

[54] DATA BUFFER FOR A LABEL READER SYSTEM INCLUDING A DATA PROCESSOR

[75] Inventors: Sadao Nakanishi; Kazuhiro Suzuki; Nobufumi Tokura; Shinichiro Endo, all of Ise, Japan

[73] Assignee: Shinko Electric Co., Ltd., Tokyo, Japan

[21] Appl. No.: 892,011

[22] Filed: Mar. 31, 1978

[30] Foreign Application Priority Data

Apr. 6, 1977 [JP] Japan .................. 52-39751

[51] Int. Cl.² ............................................. G06K 9/00
[52] U.S. Cl. ........................ 340/146.3 MA; 364/900
[58] Field of Search ............ 340/146.3 MA, 146.3 H; 235/92 SH, 92 EA; 358/256, 258, 264; 364/200 MS File, 900 MS File

[56] References Cited

U.S. PATENT DOCUMENTS

| 2,902,679 | 9/1959 | De Phillipo et al. ............... 364/900 |
| 3,200,194 | 8/1965 | Rabinow ....................... 340/146.3 H |
| 3,582,884 | 6/1971 | Shepard ........................ 340/146.3 H |
| 3,686,631 | 8/1972 | Elliott ............................. 340/146.3 H |
| 3,941,982 | 3/1976 | Knollenberg et al. ..... 340/146.3 MA |
| 3,962,681 | 6/1976 | Requa et al. ............... 340/146.3 MA |
| 4,122,443 | 10/1978 | Thaler et al. .................. 340/146.3 H |

*Primary Examiner*—Leo H. Boudreau
*Attorney, Agent, or Firm*—Lane, Aitken & Ziems

[57] ABSTRACT

A data buffer for a label reader system including a data processor. The label reader system includes at least one label reader unit, a first memory means, a second memory means, and a data processor. The first memory means is separately, switchably connected by gate means to a label reading unit, and to the data processor. The second memory means is connected to the data processor. The label reading unit provides a control signal to the gate means so that when data is being transferred between the label reading unit and the first memory means, the data processor then only can transfer data to and from the second memory means. When no data transfer is occurring between the label reading unit and the first memory means, data can then be transferred between and among the first memory means, and second memory means.

2 Claims, 2 Drawing Figures

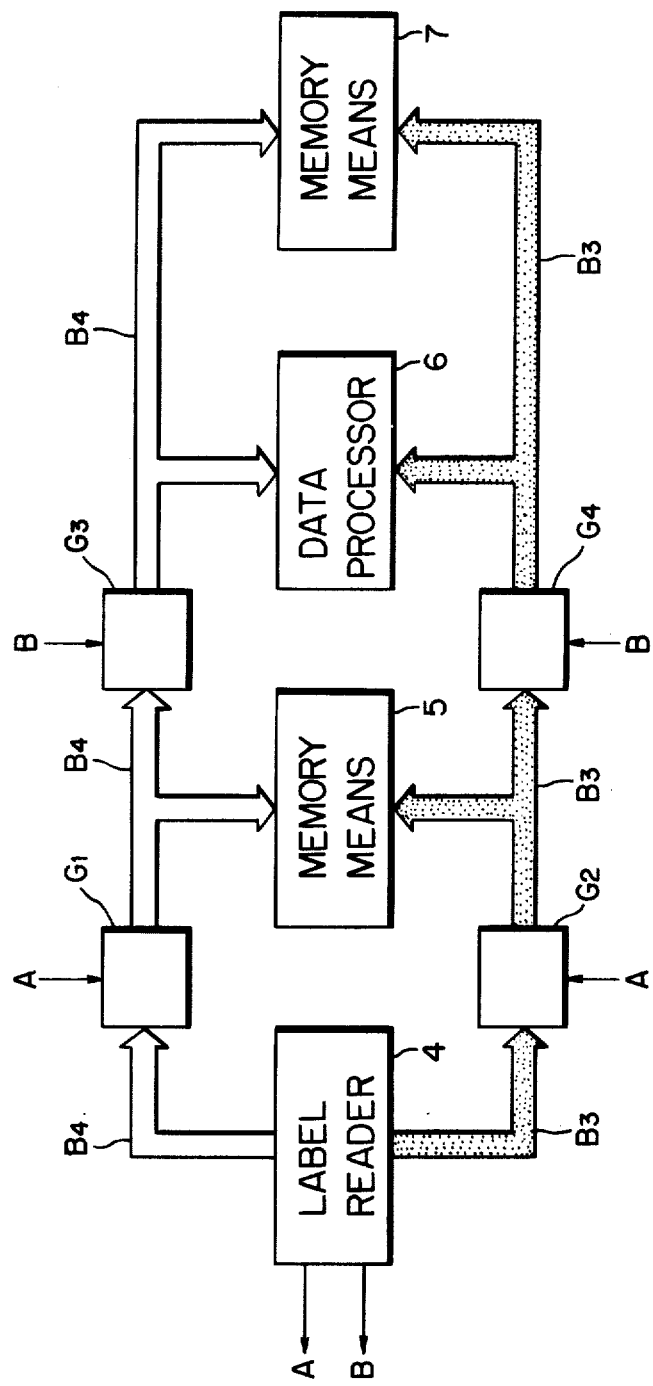
FIG. I

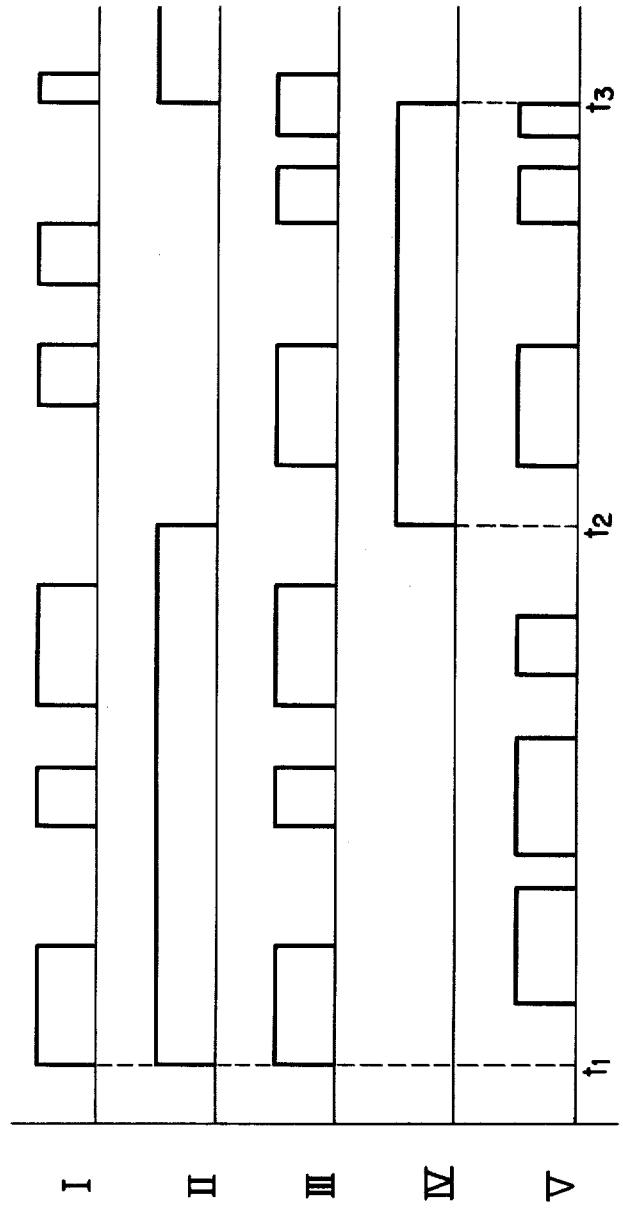

DATA BUFFER FOR A LABEL READER SYSTEM INCLUDING A DATA PROCESSOR

BACKGROUND OF THE INVENTION

The present invention relates to a data buffer for a label reading system including a data processor. Recently, data processor or computer based systems for inventory control have seen widespread use in supermarkets, department stores, warehouses, and the like. The successful operation of these computerized inventory systems is dependent, typically, upon the ability of certain peripheral equipment known as label readers to reliably read data encoded into labels associated with the inventory goods or items, and to then provide correct data to the centralized computer or data processor. Such a label reader system typically includes a plurality of separate and independent label readers, each being used independently, and sometimes simultaneously, to read labels associated with distinct and separate inventory items, and each being operably connected to the centralized computer or data processor so that its output data may be communicated to the computer.

Typical label codes associated with inventory items include so called bar codes consisting of a plurality of bars of different widths or colors. The arrangements of the bars in such a code can be interpreted by the centralized computer or data processor, based upon the data provided by the label readers, to identify the particular inventory items involved. Such bar codes are usually printed on a price tag or other label associated with the inventory items.

In such a label reader system, problems can arise in forwarding the data to the centralized data processor from each of the several remotely located label readers. These problems can arise, for example, because each label reader is operated separately, and in certain instances, each label reader will simultaneously be reading separate labels. If a number of separate label readers are each being used intensively to read labels, simultaneous or nearly simultaneous label reading will occur. When such a situation exists a procedure must be implemented so that each of the plurality of label readers do not separately, simultaneously, attempt to communicate their respective output data to the central data processor. Similar problems can arise if one or more label readers in such a system are capable of providing bursts of output data at a higher rate than the rate at which the central computer is capable of receiving the data.

Two basic approaches have been employed conventionally to cope with these problems. With the so-called programmed transfer method, the central data processor, for example, sequentially accesses or interrogates each of the label readers in the system. This approach has proven of limited utility or even of impracticability in situations in which the central data processor cannot scan the availability of output data from each of a plurality of separate label readers rapidly enough to be certain of accepting all of the output data which may be available at a given instant. The second basic method, the so-called direct memory access (DMA) method, is an approach in which each label reader is operably connected to the memory of the central computer by means of a direct memory access technique. The principal disadvantage of this approach is that DMA techniques usually involve cycle "stealing" wherein DMA data transfers occur by inhibiting the otherwise ongoing operation of the central data processor during the DMA transfer. With either of these basic techniques, the efficiency of the centralized computer is greatly reduced by the necessity for loading data from the label readers into the memory at frequent, but random points in time.

SUMMARY OF THE INVENTION

Accordingly, an object of the present invention is to provide a data buffer for a label reader system including a data processor so that the efficiency of the data processing is improved.

The present invention includes in a label reader system having at least one label reader and a central data processor having first a memory means associated therewith, a second memory means separately, switchably connected to a label reader and to the central data processor by controllable gate means. The gate means are controlled by signals from a label reader so that when data is being transferred between the label reader and the second memory means, data cannot then also be transferred between and among the second memory means, the data processor, and the first memory means. However, when data is not being transferred between the label reader and the second memory means, data may then be transferred between and among the data processor, the first memory means, and the second memory means.

Other objects and advantages of the invention will be seen from the following description taken in conjunction with the accompanying drawings.

BRIEF DESCRIPTION OF THE DRAWINGS

FIG. 1 is a block diagram of a data buffer system according to the present invention; and FIG. 2 is a set of timing signals useful in explaining the operation of the data buffer system of FIG. 1.

DESCRIPTION OF THE PREFERRED EMBODIMENT

As shown in FIG. 1 a peripheral label reading unit 4 is operably coupled or connected to a first memory means 5 through gate means $G_1$ and $G_2$. These gate means $G_1$ and $G_2$ preferably permit bidirectional signal flows therethrough, and are adapted to have their respective gating actions controlled by a control input signal A as shown. The memory means 5 is also operably coupled or connected to a data processor 6 through another set of gate means $G_3$ and $G_4$. These gate means $G_3$ and $G_4$ are similar to the gate means $G_1$ and $G_2$, but are adapted to have their respective actions controlled by a control input signal B as shown. The data processor 6 is also directly connected to a second memory means 7.

With the system of FIG. 1, data transfers occur within the system over a data buss $B_4$ while memory address signals needed for the memory read and write operations are provided over an address buss $B_3$. It is, of course, to be recognized that in certain types of systems it is possible to multiplex data signals and memory address signals over a single buss. It is also to be recognized that each of the busses $B_3$ and $B_4$ in FIG. 1 may comprise a plurality of separate signal lines.

With the system of FIG. 1, it is seen that it is possible for the label reader 4 to communicate its output data to the memory means 5 without also directly communicating with the data processor 6. As a result, the computer 6 may continue with its ongoing data processing without being interpreted, inhibited, or otherwise slowed down by the necessity of immediately accepting output data from the label reader 4 when the label reader 4 is first ready to provide such data. However, after output data from the label reader 4 has been transferred to the memory 5, the computer 6 can then communicate with and receive data from the memory means 5. As shown in FIG. 1, the data processor 6 is at all times able to communicate with the second memory means 7 over data buss $B_4$ and address buss $B_3$.

The above described operation is achieved by controlling the gate control signals A and B which are provided by the label reader 4. For simplicity of explanation, it may be assumed that control signal B is the complement of control signal A so that, for example, when the gates $G_1$ and $G_2$ are enabled, the gates $G_3$ and $G_4$ are disabled, and vice versa. Accordingly, when the label reader 4 is ready to provide output data to the memory means 5, appropriate control signals A and B are provided so that there can be, for example, bidirectional signal flows on busses $B_4$ and $B_3$ through gates $G_1$ and $G_2$ respectively, but no signal flows in either direction through gates $G_3$ and $G_4$. After the data transfer from the label reader 4 to the memory means 5 has been completed, the states of the control signals A and B are appropriately changed so that the label reader is effectively disconnected from the data and address busses by the cut off of signal flows through gates $G_1$ and $G_2$. At the same time, then, bidirectional signal flows are permitted through the gates $G_3$ and $G_4$ so that data buss $B_4$ is common to the central processor 6 as well as the memory means 5 and 7. Similarly, the address buss $B_3$ will then be common to the data processor 6 and the memory means 5 and 7.

The timing diagrams in FIG. 2 are useful to further illustrate the operation of the system as already described. For example signal II in FIG. 2 may be regarded as control signal A and signal IV as control signal B. Similarly, signal I may be regarded as representing data on a single line of the data buss $B_4$ between the label reader 4 and the gate $G_1$. Signal III is representative of data on the same single data line of the buss $B_4$ between the gates $G_1$ and $G_3$. Finally, signal V may be regarded as representing data on the same single data line of the buss $B_4$ on the portion of that buss which is always common to the data processor 6 and the memory means 7.

With these definitions of the signals I-V in FIG. 2, it is now clearly seen, for example, that the signals on the portion of the data buss $B_4$ common to the memory means 5 are also common to the portion of buss $B_4$ common to the computer 6 and the memory means 7 only when there is no data transfer between the label reader 4 and the memory means 5. For this purpose, signal II as shown in FIG. 2 between times $t_1$ and $t_2$ and after time $t_3$ represents a condition of data transfer between the label reader 4 and the memory 5. Similarly it is seen that when no data transfer between the label reader 4 and the memory means 5 is occurring as between times $t_2$ and $t_3$, the data signals on the portion of buss $B_4$ directly connected to the label reader 4 are not common the portions of buss $B_4$ connected to memory 5 and data processor 6 and memory 7.

Because the memory address buss $B_3$ in FIG. 1 may be made common to both memory means 5 and 7, it is, of course, preferable or necessary that the memory location definitions (addresses) for memory 5 and memory 7 not overlap. It is further seen that the basic data buffer system of FIG. 1 is readily expandable in a label reader system comprising a plurality of separate and independent label readers. For example, a plurality of additional label readers (such as 4), gates (such as $G_1$ and $G_2$), memory means (such as 5), and gates (such as $G_3$ and $G_4$) configured substantially as shown in FIG. 1 can also be connected to the portions of the data buss $B_4$ and the address buss $B_3$ which are always common to the data processor 6 and the memory means 7.

Accordingly, it is seen that the data buffer of the present invention permits the computer to continue its operation without interruption, or inhibition due to any necessity to immediately receive data from an external label reader. As a result, the operational efficiency of the data processor is remarkably improved, and the objects of the present invention are achieved.

It will be understood that various changes in detail and in the steps of the present invention as herein described and illustrated may be made by those skilled in the art without departing from the scope and principles of the invention as expressed in the appended claims.

What is claimed is:

1. A data buffer for a label reader system including a data processor and at least one label reader comprising:
    a data buss connected to the data output of a label reader and to the data processor;
    a first memory means connected to said data buss at a point along said data buss between the label reading unit and the data processor;
    said data buss including therein a first gate means at a point between the label reader and the point at which said first memory is connected to said data buss, and a second gate means at a point between the data processor and the point at which said first memory means is connected to said data buss, the gating actions of said first and second gate means being adapted to be controlled by control signals provided by the label reader;
    a second memory means connected to said data buss at a point such that the gating actions of said first and second gate means cannot affect the transfer of data between the data processor and said second memory means over said data buss;
    an address buss connected to the label reader, to said first memory means, to the data processor, and to said second memory means; said first memory means being connected to said address buss at a point along said address buss between the label reader and the data processor;
    a third gate means connected in said address buss at a point between the label reader and the point at which said first memory means is connected to said address buss;
    a fourth gate means connected in said address buss at a point between the data processor and the point at which said first memory means is connected to said address buss;
    wherein the gating actions of said third and fourth gate means are adapted to be controlled by said control signals; and wherein if said control signals cause said first gate means to permit the flow of data signals therethrough, then said second gate means blocks are flow of data signals therethrough; and if said control signals cause said first gate means to block the flow of data signals therethrough, then said second gate means permits the flow of data signals therethrough.

2. A data buffer for a label reader system according to claim 1, wherein the memory location addresses in said first memory means do not overlap with the memory location addresses in said second memory means.

* * * * *